US012551955B2

(12) United States Patent
Reist et al.

(10) Patent No.: US 12,551,955 B2
(45) Date of Patent: Feb. 17, 2026

(54) ACCESSORIES FOR OSCILLATING POWER TOOLS

(71) Applicant: BLACK & DECKER INC., New Britain, CT (US)

(72) Inventors: Andrew Reist, Springfield, MA (US); Matthew Christopher Green, Amherst, MA (US); Matthew Savarino, Simsbury, CT (US); Kevin M. Howe, Ludlow, MA (US)

(73) Assignee: BLACK & DECKER INC.

( * ) Notice: Subject to any disclaimer, the term of this patent is extended or adjusted under 35 U.S.C. 154(b) by 91 days.

(21) Appl. No.: 18/431,079

(22) Filed: Feb. 2, 2024

(65) Prior Publication Data
US 2024/0198442 A1    Jun. 20, 2024

Related U.S. Application Data

(63) Continuation-in-part of application No. 17/158,877, filed on Jan. 26, 2021, now Pat. No. 11,925,993.
(Continued)

(51) Int. Cl.
*B23D 61/00* (2006.01)

(52) U.S. Cl.
CPC .................................. *B23D 61/006* (2013.01)

(58) Field of Classification Search
CPC ...... B23D 61/006; B23D 51/00; B23D 49/11; B23D 61/123; B23D 61/126; B25F 3/00; B27B 19/006; A51B 17/142; A61B 17/142
USPC ...... 30/355, 392, 144, 166.3, 342, 346, 351, 30/353, 356, 502, 50, 5, 122, 393, 394, 30/277.4; 83/835, 837, 838, 846, 847,
(Continued)

(56) References Cited

U.S. PATENT DOCUMENTS 481,321 A * 8/1892 Wilson ................. B23D 61/121
83/846
942,920 A    12/1909 Martin
(Continued)

FOREIGN PATENT DOCUMENTS

DE    102011014497 A1    9/2012
DE    102012007489 A1    10/2013
(Continued)

OTHER PUBLICATIONS

Extended European Search Report, EP Application No. 21153799.8, Jun. 8, 2021, 7 pages, EPO.

*Primary Examiner* — Ghassem Alie
(74) *Attorney, Agent, or Firm* — Dickinson Wright PLLC

(57) ABSTRACT

An accessory for an oscillating power tool includes an attachment portion configured to be coupled to an oscillating power tool and a working portion coupled to the attachment portion and extending generally along a longitudinal axis. The working portion has a generally planar wedge shape bounded at least partially by a rear non-cutting end with a first width, a front cutting edge opposite the rear edge with a second width that is greater than the first width, a first side cutting edge extending from a first end of the rear end to a first end of the front cutting edge at a first angle to the longitudinal axis, and a second side cutting edge opposite the first side cutting edge and extending from a second end of the rear end to a second end of the front cutting edge at a second angle to the longitudinal axis.

19 Claims, 7 Drawing Sheets

Related U.S. Application Data

(60) Provisional application No. 62/966,275, filed on Jan. 27, 2020.

(58) Field of Classification Search
USPC ......... 83/848, 849, 850, 851, 852, 853, 854, 83/750; D8/20, 70, 96, 98, 100, 101; D24/146, 147
See application file for complete search history.

(56) References Cited

U.S. PATENT DOCUMENTS

| | | |
|---|---|---|
| D170,202 S | 8/1953 | Knapp |
| 3,680,610 A | 8/1972 | Lindgren |
| 3,837,024 A | 9/1974 | Saunders |
| 5,002,555 A | 3/1991 | Petersen |
| 5,133,728 A | 7/1992 | Petersen |
| 5,135,533 A | 8/1992 | Petersen et al. |
| 5,697,835 A | 12/1997 | Nitz et al. |
| 5,809,657 A | 9/1998 | Mortensen |
| D402,516 S | 12/1998 | Okada |
| D448,634 S | 10/2001 | Hickman |
| D485,140 S | 1/2004 | Rack |
| 6,886,261 B2 | 5/2005 | Haut |
| 7,574,803 B2 | 8/2009 | Parker |
| D741,126 S | 10/2015 | Sis |
| 10,307,917 B2 * | 6/2019 | Marks ...................... B26D 1/30 |
| 10,799,968 B2 | 10/2020 | Bozic |
| 2002/0104421 A1 * | 8/2002 | Wurst .................. B23D 61/021 83/835 |
| 2007/0074406 A1 | 4/2007 | Magyla |
| 2013/0133501 A1 | 5/2013 | Zhang |
| 2013/0174701 A1 | 7/2013 | Elliston et al. |
| 2014/0190328 A1 | 7/2014 | Karlen |
| 2016/0082605 A1 | 3/2016 | Marks |
| 2021/0114125 A1 | 4/2021 | Heath et al. |

FOREIGN PATENT DOCUMENTS

| | | | |
|---|---|---|---|
| DE | 102009041114 B4 | 10/2015 | |
| EP | 2295211 A1 * | 3/2011 | .......... B23D 61/006 |
| EP | 2499978 B1 | 8/2016 | |
| EP | 2295211 B1 | 5/2017 | |
| WO | 2004105623 A1 | 12/2004 | |
| WO | 2020114663 A1 | 6/2020 | |

* cited by examiner

ACCESSORIES FOR OSCILLATING POWER TOOLS

RELATED APPLICATIONS

This application claims priority, under 35 U.S.C. § 120, as a continuation-in-part of U.S. patent application Ser. No. 17/158,877, filed Jan. 26, 2021, titled "Accessories for Oscillating Power Tools," which claims priority, under 35 U.S.C. § 119(e) to U.S. Provisional Application No. 62/966,275, filed Jan. 27, 2020, titled "Accessories for Oscillating Power Tools," each of which is incorporated by reference.

TECHNICAL FIELD

This application relates to accessories (such as cutting tools and saw blades) for oscillating power tools.

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. It is desirable to have oscillating accessories for performing variety of tasks.

SUMMARY

In an aspect, an accessory for an oscillating power tool includes an attachment portion configured to be coupled to an oscillating power tool and a working portion coupled to the attachment portion and extending generally along a longitudinal axis. The working portion has a generally planar wedge shape bounded at least partially by a rear non-cutting end with a first width, a front cutting edge opposite the rear edge with a second width that is greater than the first width, a first side cutting edge extending from a first end of the rear end to a first end of the front cutting edge at a first angle to the longitudinal axis, and a second side cutting edge opposite the first side cutting edge and extending from a second end of the rear end to a second end of the front cutting edge at a second angle to the longitudinal axis.

Implementations of this aspect may include one or more of the following features. The first cutting edge may have a first plurality teeth and the first and second side cutting edges each may have a second plurality of teeth. The first plurality of teeth may be configured differently than the second plurality of teeth. The first plurality of teeth may have a first tooth pitch and the second plurality of teeth may have a second tooth pitch that is different than the first tooth pitch. The first tooth pitch may be greater than or less than the second tooth pitch. The working portion may be symmetrical about the longitudinal axis. The first angle may be approximately equal to the second angle. The working portion may be configured to cut an opening for receiving at least one of a gang box, an electrical outlet, and an electrical switch. The second width may be approximately equal to or slightly greater than or less than a width of the gang box, the electrical outline, or the electrical switch. The second width may be approximately 1.75 inches to approximately 2.25 inches. The first angle and the second angle each may be approximately 4° to approximately 31°. The working portion may have a length along the longitudinal axis from the rear end to the front cutting edge of approximately 1.25 inches to approximately 2 inches. The attachment portion and the working portion may be connected by an intermediate portion. The working portion may lie in a plane that is offset from a plane in which the attachment portion lies. The intermediate portion may have a first end coupled to the attachment portion, a second end coupled to the working portion, and an angled portion connecting the first end to the second end and at a third angle to the longitudinal axis. The third angle may be approximately 15° to approximately 89°. The attachment portion may include a plurality of openings configured to enable the attachment portion to be coupled to a plurality of different oscillating power tools.

Advantages may include one or more of the following. The oscillating accessories may be used for creating openings for installation of electrical gang boxes, electrical outlets, and wall switches quickly and efficiently with a minimal amount of measuring and aligning. These and other advantages and features will be apparent from the description, the drawings, and the claims.

DETAILED DESCRIPTION

Figure 1A:
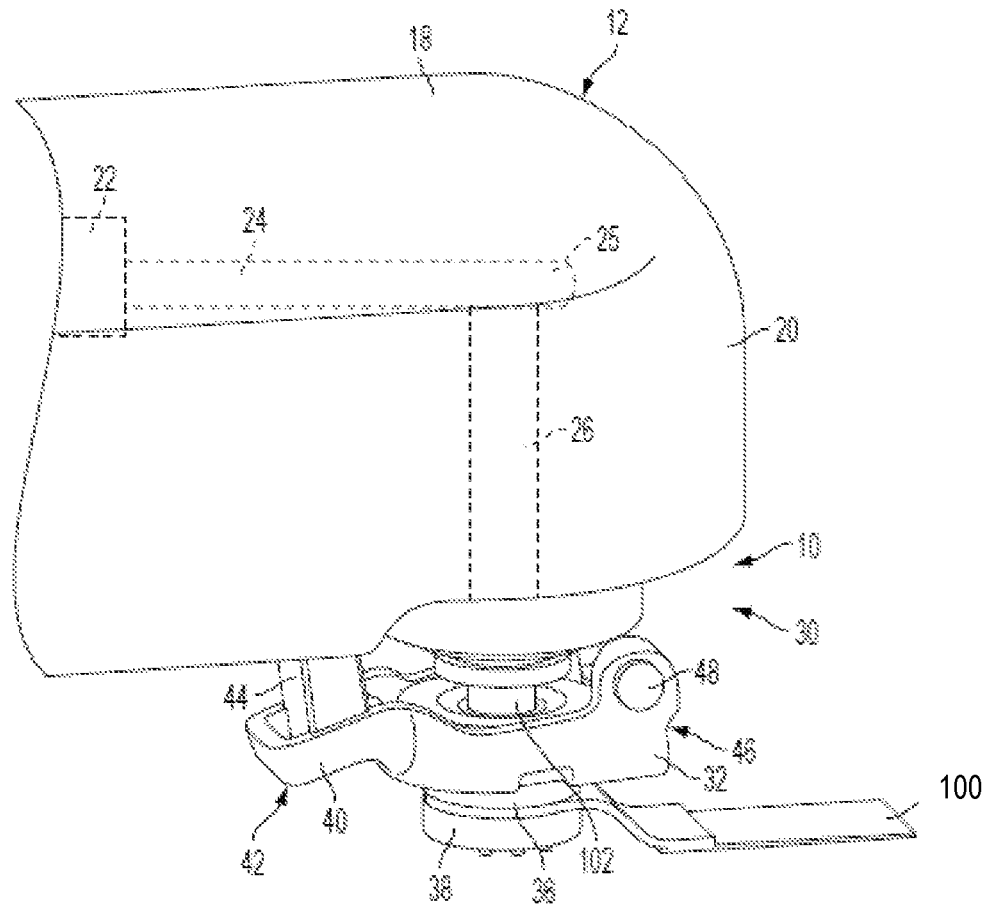
FIG. 1A is a perspective view an oscillating power tool having an implementation of an accessory attachment mechanism.
Figure 1B:
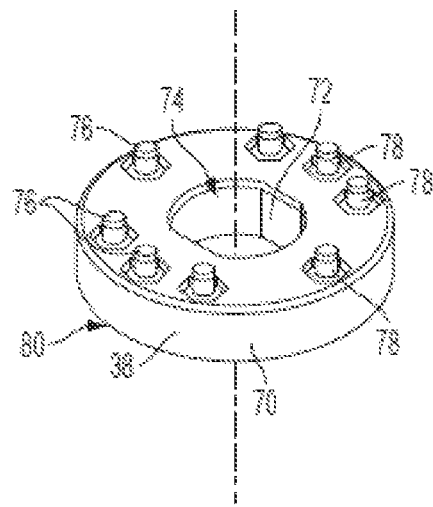
FIG. 1B a perspective view of a clamping plate of the attachment mechanism of FIG. 1A.

Referring to FIGS. 1A and 1B, in an implementation, an oscillating power tool 12 usable with the accessories described in this application is similar to oscillating power tools sold under the brand names DEWALT® and Porter-Cable® and is described further in U.S. Pat. No. 8,925,931, which is hereby incorporated by reference. The power tool 12 includes a tool body 18 including a housing 20 that contains a motor 22 to drive an output member 24. An output spindle 26 is coupled to the motor 22 via a transmission 25 that converts rotary motion of the motor 22 to oscillating motion of the spindle 26. The output of the spindle 26 is coupled to an accessory attachment mechanism 10 via an output shaft 102. The accessory attachment mechanism 10 does not require the use of a separate tool to couple an accessory or blade (such as the accessory 100 shown in FIGS. 2A-2B, as described below) to the oscillating power tool (also known as a "tool-free" attachment mechanism). An exemplary tool-free attachment mechanism 10 includes a clamp assembly 30 having a first clamp member 36 fixedly coupled to the output spindle, a second clamp member 38 facing the first clamp member 36, and a lever 32 coupled to the second clamp member 38. The lever 32 includes a lever arm 40 with a user engagement portion 42 and a block 44. The lever 32 further includes a pivot portion 46 having a pivot axle 48. The second clamp member 38 includes a second clamp body 70 generally in the form of a ring having a central opening 72. The second clamp body 70 has a second clamping surface 74 having a plurality of mounting features 76 formed thereon. In the example shown, the plurality of mounting features 76 are in the form of male projections 78. In the particular example shown, the eight male projections 78 each have a circular cross section and a tapered shape or form. In another related implementation, the male projections may have an oblong, oval, or rectangular cross-section and may also be tapered. In other implementations, the accessory 100 described below may be configured for use with or adapted for use with other oscillating power tools and accessory mounting mechanisms for oscillating power tools, such as those disclosed in U.S. patent application Ser. Nos. 16/511,043; 15/893,610; 15/253,559; 15/065,024; 14/909,233; 14/909,247; and Ser. No. 12/798,997; and U.S. Pat. Nos. 10,350,721; 10,137,592; 10,040,215; 9,670,998; 9,272,435; 9,346,183; 8,585,469; 8,182,316, each of which is incorporated by reference.

Figure 2A:
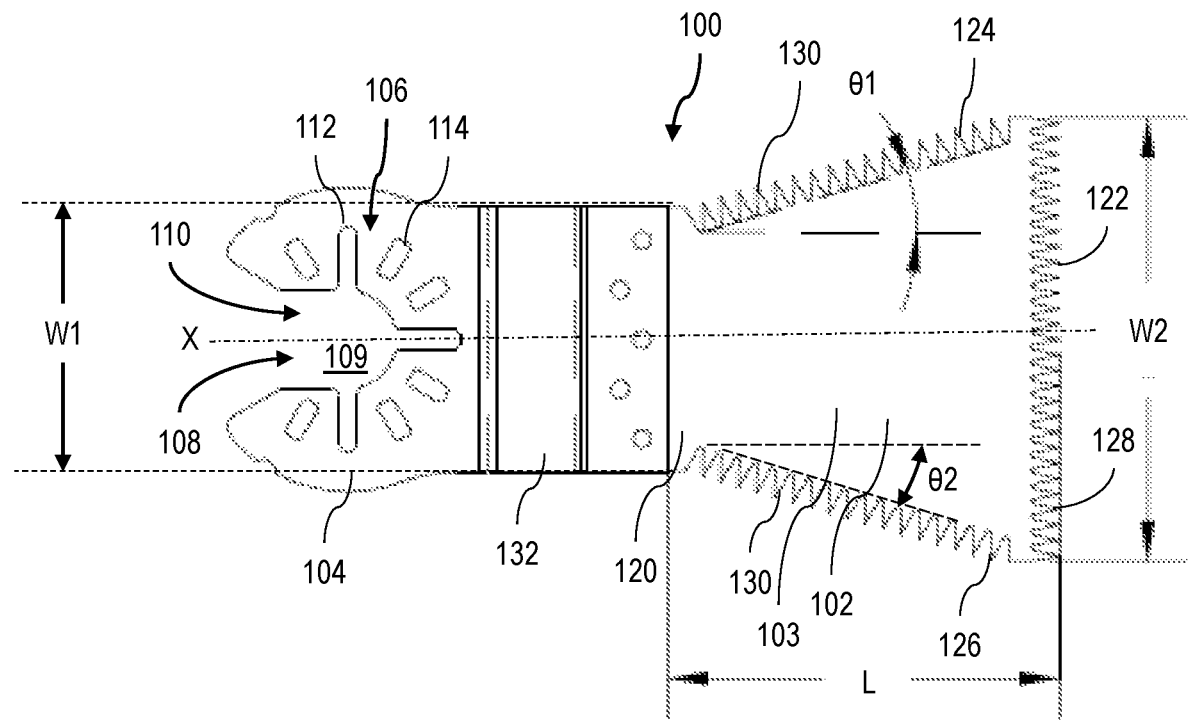
FIG. 2A is a top view of an implementation of an accessory configured to be coupled to an attachment mechanism of an oscillating power tool, such as the power tool in FIGS. 1A-1B.
Figure 2B:
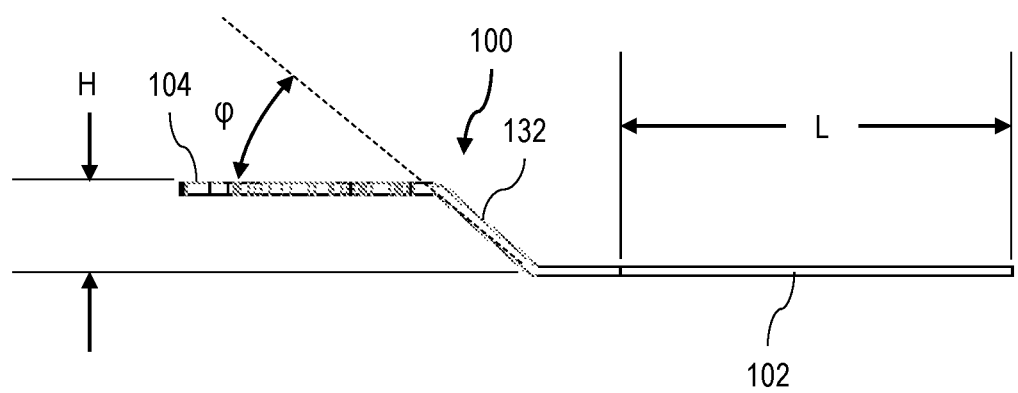
FIG. 2B is a side view of the accessory of FIG. 2A.

Referring also to FIGS. 2A-2B, an implementation of an oscillating accessory 100 includes a working portion 102 and an attachment portion 104. In one implementation, the attachment portion 104 includes a plurality of recesses or openings 106 configured to couple the accessory 100 to an attachment mechanism of an oscillating power tool, such as the attachment mechanism 10 of the oscillating power tool 12 described above or the other attachment mechanisms for oscillating power tools incorporated by reference and listed above. The openings 106 may include a generally U-shaped opening 108 extending from a rear end portion 110 of the accessory 100 and terminating in a central portion 109. A first set of three radial arm openings 112 are in communication with and extend radially outward from the central portion 108 at approximately 90°, approximately 180°, and approximately 270°, respectively, relative to the U-shaped opening 108. A second set of six radial openings 114 are spaced radially outward from and not in communication with the central portion 109, and are positioned at approximately 60°, approximately 120°, approximately 150°, approximately 210°, approximately 240°, and approximately 300° relative to the U-shaped opening 108. This configuration enable the attachment portion to be coupled to a wide variety of brands of power tools. In other implementations, the attachment portion may have a configuration similar to those shown, e.g., in U.S. Pat. Nos. 10,245,716 and 10,265,778, which are incorporated by reference. In certain implementations, the attachment portion may be universal or nearly universal and/or may be coupleable to two or more the oscillating power tools described and incorporated by reference above.

The working portion 102 is coupled to the attachment portion 104 and extends generally along a longitudinal axis X. The working portion 102 has a generally planar wedge shaped body 103 bounded at least partially by a rear non-cutting end 120, a front cutting edge 122 opposite the rear non-cutting end 120, a first side cutting edge 124 extending from a first end of the rear end 120 to a first end of the front cutting edge 122, and a second side cutting edge 126 opposite the first side cutting edge 124 and extending from a second end of the rear end 120 to a second end of the front cutting edge 122. The rear end 120 of the body 103 has a first width W1 and the front cutting edge 122 has a second width W2 that is greater than the first width W1. In an implementation, the first width W1 is approximately 0.75 inches to approximately 1.5 inches (e.g., approximately 1.0 inches) and the second width W2 is approximately 1.75 inches to approximately 2.25 inches (e.g. approximately 2 inches). The working portion has a length L along the longitudinal axis from the rear end 120 of the body 103 to the front cutting edge 122. In an implementation, the length L may be approximately 1.25 inches to approximately 2 inches (e.g., approximately 1.5 inches). The first side cutting edge 124 is disposed at a first angle θ1 to the longitudinal axis X and the second side cutting edge 126 is disposed at a second angle θ2 to the longitudinal axis. In an implementation, both the first and second angles θ1, θ2 may be acute angles. In certain implementations, the working portion 102 is symmetrical about the longitudinal axis with the first angle θ1 approximately equal to the second angle θ2. For example, each of the first angle θ1 and the second angle θ2 may be approximately 4° to approximately 31° (e.g., approximately 16°).

The front cutting edge 122 has a first plurality of teeth 128 and the first and second side cutting edges 124, 126 each have a second plurality of teeth 130. In certain implementations, the first plurality of teeth 128 and the second plurality of teeth 130 may be configured to be different from one another. For example, the first plurality of teeth 128 and the second plurality of teeth 130 may have a different pitch (teeth per inch or tpi), tooth height, tooth width, tooth thickness, set pattern, gullet depth, rake angle, relief angle, top bevel angle, and/or side bevel angle. In one exemplary implementation, the first plurality of teeth 128 has a first tooth pitch and the second plurality of teeth 130 has a second tooth pitch that is different than the first tooth pitch. For example, the first tooth pitch (e.g., approximately 10 tpi to approximately 32 tpi) may be greater than the second tooth pitch (e.g., approximately 8 tpi to approximately 20 tpi). In other examples, the first tooth pitch (e.g., approximately 8 tpi to approximately 20 tpi) may be greater than the second tooth pitch (e.g., approximately 10 tpi to approximately 32 tpi). In still other examples, one of the first and second tooth pitches may be variable, while the other may be constant.

The working portion 102 may be connected to the attachment portion 104 by an intermediate portion 132. In the implementation illustrated in FIG. 2B, the working portion 102 and the attachment portion 104 may substantially lie (or may have portions that substantially lie) in parallel planes that are offset from one another by a height H (e.g., approximately 0.3 inches to approximately 0.6 inches). The intermediate portion 132, may disposed at a right angle or an acute angle φ (e.g., approximately 15° to approximately 89°) to the attachment portion. This offset may make it easier for the blade 100 to plunged deeper into a workpiece without interference from the clamp assembly 100 on the oscillating power tool 12. In other implementations, the working portion 102 and the attachment portion may be substantially co-planar (or have portions that are substantially co-planar) or may substantially lie (or have portions that substantially lie) in planes that are at an angle to one another. It will be understood to one of ordinary skill in the art that the working portion 102 and the attachment portion 104 may not be planar but instead may have portions that substantially lie in or along a plane.

Figure 3A:
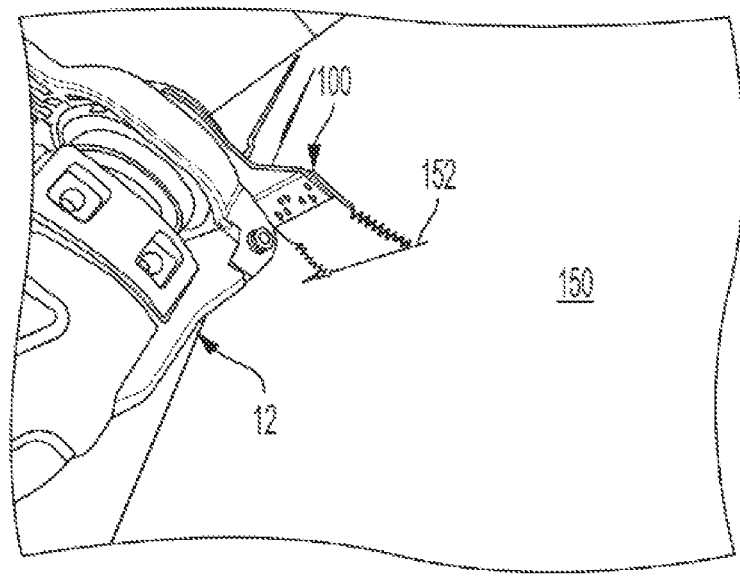
FIGS. 3A-3C illustrate the oscillating power tool of FIGS. 1A-1B and the accessory of FIGS. 2A-2B in use to create an opening in a workpiece.
Figure 3B:
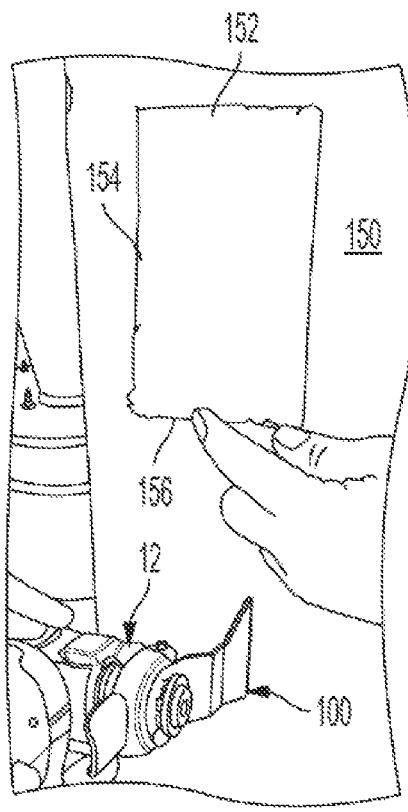
Figure 3C:
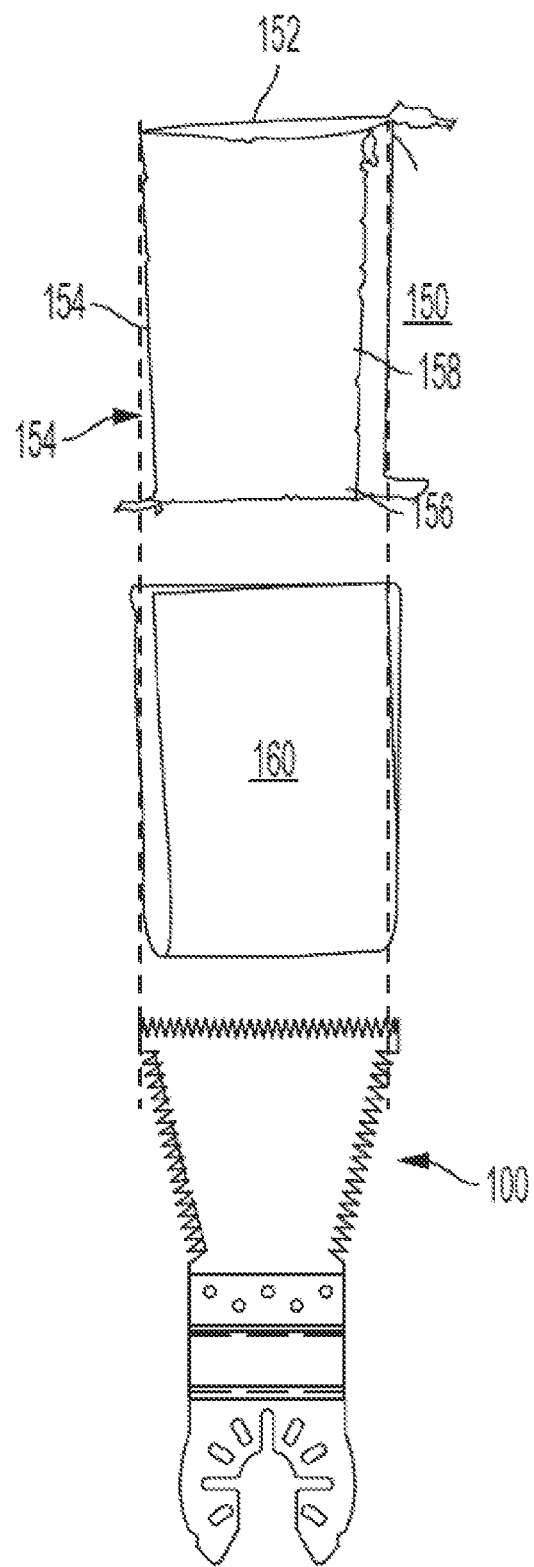

Referring also to FIGS. 3A-3C, the working portion 102 may be configured to cut an opening 162 (e.g., a rectangular opening) in workpiece 150 (such as a section of drywall) for receiving at least one of a gang box, an electrical outlet, and an electrical switch. For example, the second width W2 of front cutting edge 122 of the working portion 102 may be approximately equal to or slightly greater than or less than a width of a standard gang box, electrical outlet, and/or electrical switch. In an implementation, a standard gang box, electrical outlet, and/or electrical switch may have a width of approximately 2 inches and the second width W2 of the front cutting edge 122 may be approximately 1.75 inches to approximately 2.25 inches (e.g., approximately 2 inches).

In use, as shown in FIG. 3A, the saw blade 100 is coupled to an oscillating power tool (e.g., oscillating power tool 12). The front cutting edge 122 is plunged into the wall 150 to make a first cut 152 corresponding to the width of the top of the gang box, electrical outlet, and/or electrical switch. If necessary, the second and third cutting edges 124, 126 may be used to further widen the cut. Following this, the saw blade 100 is removed from the workpiece. Next, as shown in FIG. 3B, the front cutting edge 122 is plunged into the wall 150 to make a second cut 154 perpendicular to the first cut 152, which corresponds to the left side of a gang box, electrical outlet, and/or electrical switch. The second and/or third cutting edges 124, 126 are then used to lengthen the second cut to correspond the height of the gang box, electrical outlet, and/or electrical switch. Following this, the saw blade 100 is removed. Next, the front cutting edge is plunged into the wall 150 to make a third cut 156 parallel to and opposite the first cut 152, which corresponds to the bottom of a gang box, electrical outlet, and/or electrical switch. If necessary, the second and third cutting edges 124, 126 may be used to further widen the third cut. After this, the saw blade 100 is removed from the workpiece. Finally, as shown in FIG. 3C, the front cutting edge 122 is plunged into the wall 150 to make a fourth cut 158 parallel to and opposite the second cut 154, which corresponds to the right side of a gang box, electrical outlet, and/or electrical switch. The second and/or third cutting edges 124, 126 are then used to lengthen the fourth cut to correspond the height of the gang box, electrical outlet, and/or electrical switch. The saw blade 100 then can be removed and/or used to pry out a rectangular section 160 from the workpiece 150 to leave the rectangular opening 162 for installing a gang box, electrical outlet, and/or electrical switch. This enables fast and efficient installation of a gang box, electrical outlet, and/or electrical switch with a minimum of measuring and aligning. The saw blade 100 may be used for creating openings in a wall for other sizes or configurations of gang boxes, electrical outlets, and/or electrical switches.

Figure 4A:
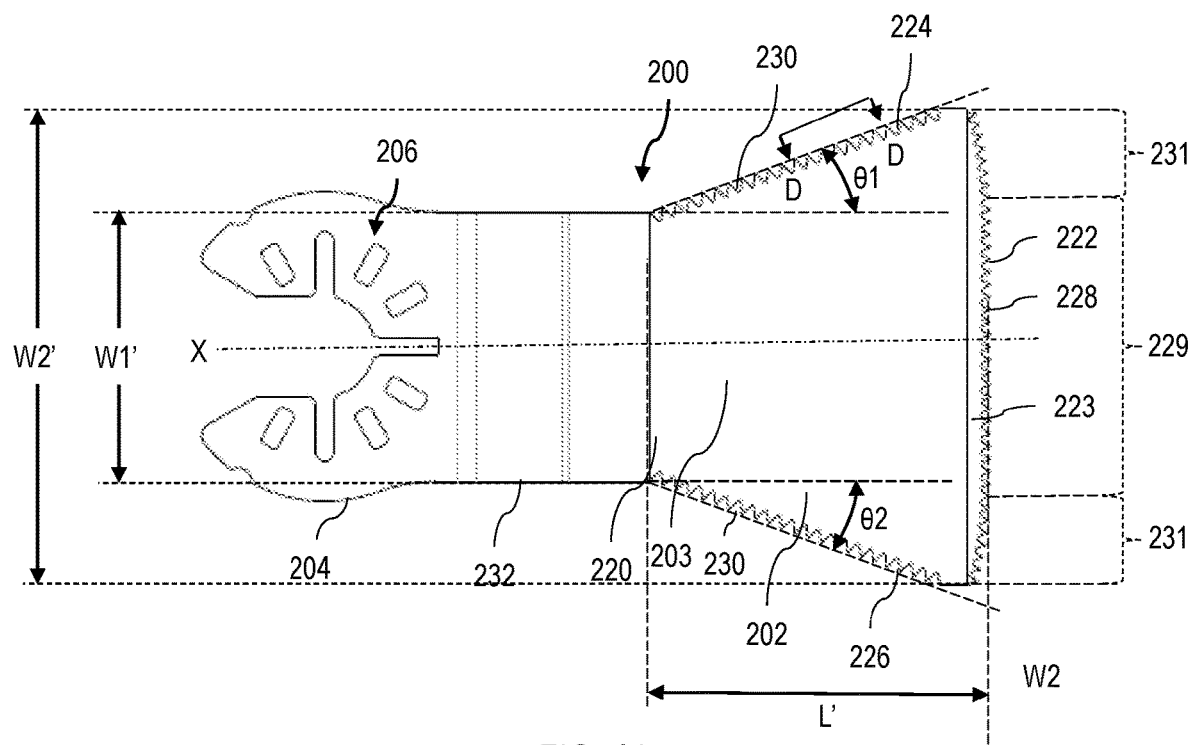
FIG. 4A is a top view of another implementation of an accessory configured to be coupled to an attachment mechanism of an oscillating power tool, such as the power tool in FIGS. 1A-1B.
Figure 4B:
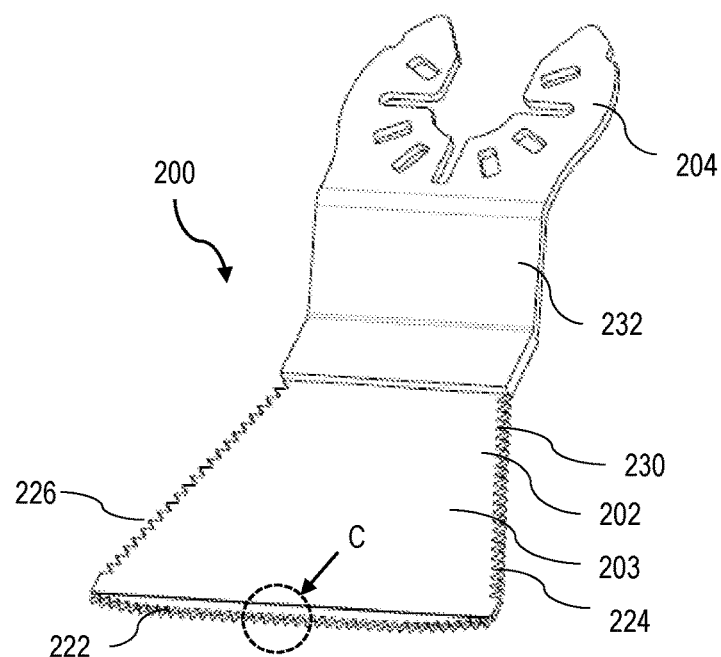
FIG. 4B is a perspective view of the accessory of FIG. 4A.

Referring also to FIGS. 4A-4B, another implementation of an oscillating accessory 200 includes a working portion 202, an attachment portion 204, and an intermediate portion 232 coupling the working portion 202 to the attachment portion 204. In an implementation, the attachment portion 204 and the intermediate portion 232 are the same as or similar to the attachment portion 104 and intermediate portion 132 of the accessory 100. The attachment portion 204 includes a plurality of recesses or openings 206 configured to couple the accessory 200 to an attachment mechanism of an oscillating power tool, such as the attachment mechanism 10 of the oscillating power tool 12 described above or the other attachment mechanisms for oscillating power tools incorporated by reference and listed above.

The working portion 202 is coupled to the attachment portion 204 and extends generally along a longitudinal axis X. Like the working portion 102 of the accessory 100, the working portion 202 has a generally planar wedge shaped body 203 bounded at least partially by a rear non-cutting end 220, a front cutting edge 222 opposite the rear non-cutting end 220, a first side cutting edge 224 extending from a first end of the rear end 220 to a first end of the front cutting edge 222, and a second side cutting edge 226 opposite the first side cutting edge 224 and extending from a second end of the rear end 220 to a second end of the front cutting edge 222.

The front cutting edge 222 is disposed on a front cutting body 223 that is coupled to a front end of the wedge shaped body 203, e.g., by welding, brazing, adhesive, or other attachment mechanisms. The front cutting body 223 may be composed of a different material than the wedge shaped body 203. For example, the wedge shaped body 203 may be composed of a first metal (e.g., low carbon steel and/or tool steel) and the front cutting body 223 may be composed of a second, harder metal (e.g., a high speed steel, for a bi-metal accessory) or a hard metal compound (e.g., a carbide material for a carbide tooth accessory). The front cutting edge 222 includes a first plurality of teeth 228 disposed along a central portion 229 that is generally straight and generally perpendicular to the axis X and lateral convex curved portions 231. Alternatively, the front cutting edge 222 may be entirely curved, entirely straight, or may have a different shape.

Figure 4C:
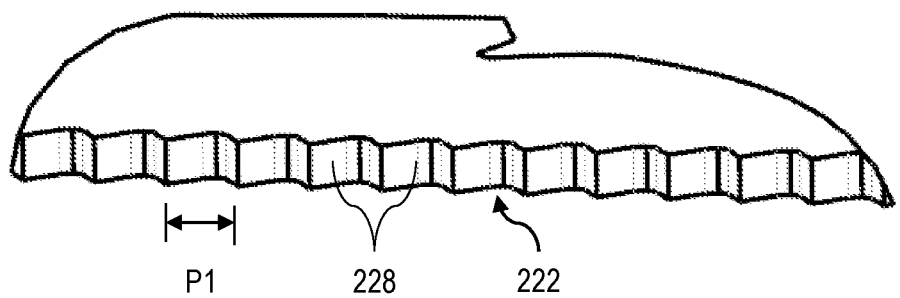
FIG. 4C is a detail view of circled portion C of the accessory shown in FIG. 4B.
Figure 4D:
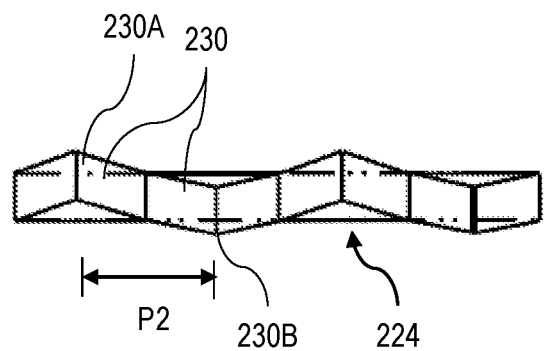
FIG. 4D is a side view along arrows A-A of the accessory shown in FIG. 4A.
Figure 5:
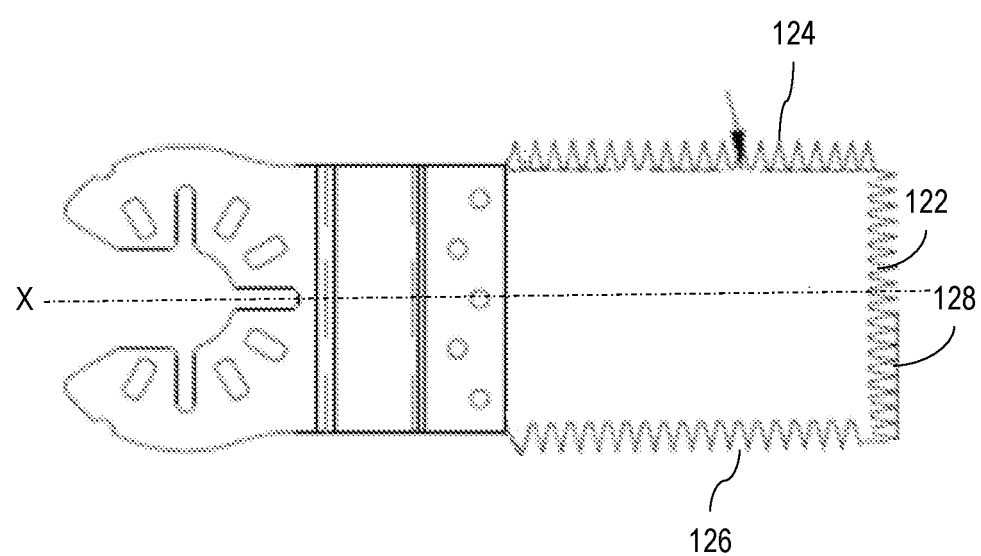
FIG. 5 is a top view of another implementation of an accessory configured to be coupled to an attachment mechanism of an oscillating power tool.

The first and second side cutting edges 224, 226 each have a second plurality of teeth 230 that are formed in the wedge shaped body 203. In other implementations, the first and second side cutting edges 224, 226 may be disposed on side cutting bodies composed of different materials than the wedge shaped body 203 and coupled to the wedge shaped body 203 in a similar manner as the front cutting body 223. Referring also to FIGS. 4C and 4D, in certain implementations, the first plurality of teeth 228 and the second plurality of teeth 230 may be configured to be different from one another. For example, the first plurality of teeth 228 and the second plurality of teeth 230 may have a different pitch (teeth per inch or tpi), tooth height, tooth width, tooth thickness, set pattern, gullet depth, rake angle, relief angle, top bevel angle, and/or side bevel angle. In one such example implementation, as shown in FIGS. 4C and 4D, the first plurality of teeth 228 are spaced from each other by a first distance P1 such that they have a first tooth pitch and the second plurality of teeth 230 are spaced from each other by a second distance P2 that is different than the first distance P1 such that they have a second tooth pitch that is different than the first tooth pitch. For example, in the illustrated example, the first tooth pitch (e.g., approximately 10 tpi to approximately 32 tpi) may be greater than the second tooth pitch (e.g., approximately 8 tpi to approximately 20 tpi). In other examples, the first tooth pitch (e.g., approximately 8 tpi to approximately 20 tpi) may be less than the second tooth pitch (e.g., approximately 10 tpi to approximately 32 tpi). In still other examples, one of the first and second tooth pitches may be variable, while the other may be constant. In another such example implementation, as shown in FIGS. 4C and 4D, the first plurality of teeth 228 and the second plurality of teeth 230 may have a different set pattern. For example, in the illustrated embodiment, the first plurality of teeth 228 are all unset and the second plurality of teeth 230 are set in a pattern that alternates between a first tooth 230A set in a first direction and a second tooth 230B set in a second direction that is opposite the first direction. In other embodiments, the first plurality of teeth may be set in different directions while the second plurality of teeth may be unset and/or a set pattern for a given plurality of teeth may have a different pattern (e.g., a three tooth pattern comprising a first unset tooth, a second tooth set in a first direction, and a third tooth set in a second opposite direction).

The rear end 220 of the wedge shaped body 203 has a first width W1' and the front cutting edge 222 has a second width W2' that is greater than the first width W1'. In an implementation, the first width W1' is approximately 0.75 inches to approximately 1.5 inches (e.g., approximately 1.0 inches) and the second width W2' is approximately 1.75 inches to approximately 2.25 inches (e.g. approximately 2 inches). The working portion has a length L' along the longitudinal axis from the rear end 220 of the wedge shaped body 203 to an apex 207 of the front cutting edge 222. In an implementation, the length L' may be approximately 1.25 inches to approximately 2 inches (e.g., approximately 1.5 inches). The first side cutting edge 224 is disposed at a first angle $\theta1'$ to the longitudinal axis X and the second side cutting edge 226 is disposed at a second angle $\theta2'$ to the longitudinal axis. In an implementation, both the first and second angles $\theta1'$, $\theta2'$ may be acute angles. In certain implementations, the working portion 202 is symmetrical about the longitudinal axis X with the first angle $\theta1'$ approximately equal to the second angle $\theta2'$. For example, each of the first angle $\theta1'$ and the second angle $\theta2'$ may be approximately 4° to approximately 31° (e.g., approximately 16°). The working portion 202 of the accessory 200 may be configured to cut an opening (e.g., a rectangular opening) in a workpiece (such as a section of drywall) for receiving at least one of a gang box, an electrical outlet, and an electrical switch, similar to the working portion 102 of the accessory 100.

Example implementations have been provided so that this disclosure will be thorough, and to fully convey the scope to those who are skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:
1. An accessory comprising:
an attachment portion configured to be coupled to an oscillating power tool;
a working portion coupled to the attachment portion and extending generally along a longitudinal axis, the working portion having a planar wedge shaped body bounded at least partially by a non-cutting rear end with a first width, a front cutting edge opposite the rear end with a second width that is greater than the first width, a first side cutting edge extending from a first end of the rear end to a first end of the front cutting edge at a first angle to the longitudinal axis, and a second side cutting edge opposite the first side cutting edge and extending from a second end of the rear end to a second end of the front cutting edge at a second angle to the longitudinal axis;
the front cutting edge including a straight central portion extending along a straight line arranged generally perpendicular to the axis and first and second convex curved lateral portions continuous with and extending laterally outward from the central portion and convexly from the straight line to the first side cutting edge and the second side cutting edge, respectively; and
the front cutting edge having a first plurality of teeth and the first and second side cutting edges having a second plurality of teeth being set to include a repeating set pattern having at least one first tooth set in a first direction and at least one second tooth set in a second direction opposite to the first direction.

2. The accessory of claim 1, wherein the first plurality of teeth are configured differently than the second plurality of teeth.

3. The accessory of claim 2, wherein the first plurality of teeth have a first tooth pitch and the second plurality of teeth has a second tooth pitch that is different than the first tooth pitch.

4. The accessory of claim 3, wherein the first tooth pitch is greater than the second tooth pitch.

5. The accessory of claim 2, wherein the first plurality of teeth has a first set pattern that is different than the repeating set pattern for the second plurality of teeth.

6. The accessory of claim 5, wherein the first plurality of teeth are unset.

7. The accessory of claim 1, wherein the working portion is symmetrical about the longitudinal axis.

8. The accessory of claim 1, wherein the first angle is approximately equal to the second angle.

9. The accessory of claim 1, wherein the attachment portion and the working portion are connected by an intermediate portion, such that the working portion lies in a plane that is offset from a plane in which the attachment portion lies.

10. The accessory of claim 1, wherein the first cutting edge is disposed on a front cutting body that is coupled to a front end of the wedge shaped body, the front cutting body formed of a harder material than the wedge shaped body.

11. An accessory comprising:
an attachment portion configured to be coupled to an oscillating power tool; and
a working portion coupled to the attachment portion and extending generally along a longitudinal axis, the working portion having a planar wedge shaped body bounded at least partially by a non-cutting rear end with a first width, a front cutting edge with a first plurality of teeth opposite the rear end with a second width that is greater than the first width, a first side cutting edge extending from a first end of the rear end to a first end of the front cutting edge at a first angle to the longitudinal axis, and a second side cutting edge opposite the first side cutting edge and extending from a second end of the rear end to a second end of the front cutting edge at a second angle to the longitudinal axis;
wherein the front cutting edge extends continuously between the first side cutting edge and the second side cutting edge and is curved at least adjacent each of the first and second side cutting edges, and
wherein the front cutting edge includes a first plurality of teeth with a first set pattern and the first and second side edges each include a second plurality of teeth with a repeating set pattern having at least one first tooth set in a first direction and at least one second tooth set in a second direction opposite to the first direction.

12. The accessory of claim 11, wherein the first plurality of teeth are unset.

13. The accessory of claim 11, wherein the first plurality of teeth have a first tooth pitch and the second plurality of teeth has a second tooth pitch that is different than the first tooth pitch.

14. The accessory of claim 13, wherein the first tooth pitch is greater than the second tooth pitch.

15. The accessory of claim 11, wherein the working portion is symmetrical about the longitudinal axis.

16. The accessory of claim 11, wherein the first angle is approximately equal to the second angle.

17. The accessory of claim 11, wherein the attachment portion and the working portion are connected by an intermediate portion, such that the working portion lies in a plane that is offset from a plane in which the attachment portion lies.

18. The accessory of claim 11, wherein the first cutting edge is disposed on a front cutting body that is coupled to a front end of the wedge shaped body, the front cutting body formed of a harder material than the wedge shaped body.

19. An accessory comprising:
an attachment portion configured to be coupled to an oscillating power tool;
a working portion coupled to the attachment portion and extending generally along a longitudinal axis, the working portion having a planar wedge shaped body bounded at least partially by a non-cutting rear end with a first width, a front cutting edge opposite the rear end with a second width that is greater than the first width, a first side cutting edge extending from a first end of the rear end to a first end of the front cutting edge at a first angle to the longitudinal axis, and a second side cutting edge opposite the first side cutting edge and extending from a second end of the rear end to a second end of the front cutting edge at a second;
the front cutting edge including a straight central portion extending along a straight line arranged generally perpendicular to the axis and first and second convex curved lateral portions continuous with and extending laterally outward from the central portion and convexly from the straight line to the first side cutting edge and the second side cutting edge, respectively, the central portion having a third width that is at least half of the second width; and
wherein the front cutting edge includes a first plurality of teeth that are unset and the first and second side edges each include a second plurality of teeth with a repeating pattern of a first tooth set in a first direction and a second tooth set in a second direction opposite the first direction.

* * * * *